May 5, 1931. H. C. LIPTHROTT 1,804,355
FISH HOOK AND TRAP
Filed Sept. 25, 1929 2 Sheets-Sheet 1

Henry C. Lipthrott
INVENTOR
BY Victor J. Evans
ATTORNEY

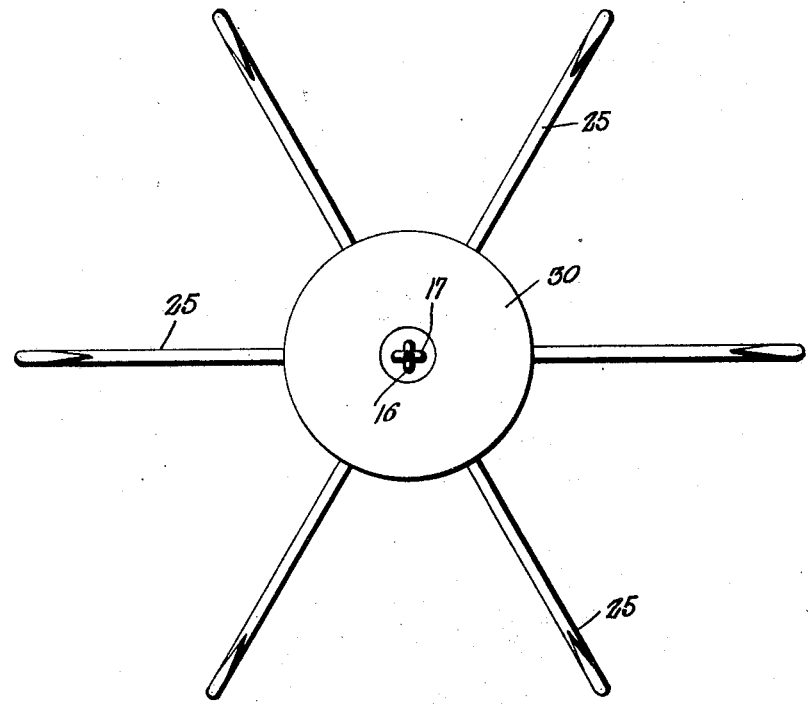
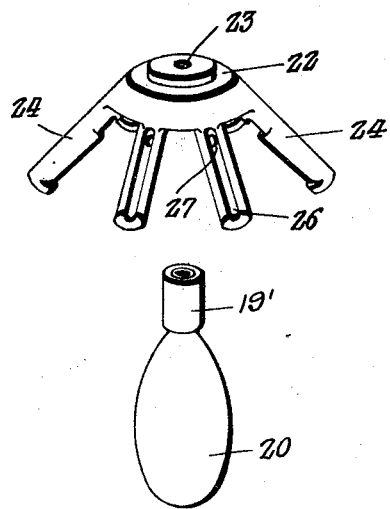
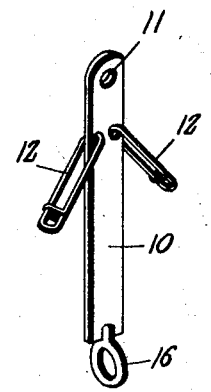

Patented May 5, 1931

1,804,355

UNITED STATES PATENT OFFICE

HENRY CLINTON LIPTHROTT, OF NEW ORLEANS, LOUISIANA

FISH HOOK AND TRAP

Application filed September 25, 1929. Serial No. 395,143.

The object of this invention is to provide a device including a hook or hooks for receiving bait and independent means for hooking one or more fish attempting to secure bait, the means last named being adapted to engage the under side of the jaw of the fish by producing tension on the line by means of which the device is controlled.

A further object is to make it possible to secure fish of any reasonable size or number, attempting to partake of the bait, regardless of the fact that there may be only a nibble or bite, and no positive engagement with the bait holding means.

A further object is to provide for a certain swivel connection referred to below, preventing the unnecessary twisting of the line, and to provide for special mounting of the hooks by means of which the fish are actually hooked, so that these hooks may be replaced individually as occasion arises.

With the foregoing and other objects in view, the invention consists in the novel construction and arrangement of elements disclosed, it being understood that modifications may be made within the scope of the claims without departing from the spirit of the invention.

In the drawings forming part of this application:—

Figure 3 is a top plan view.

Figure 4 is a perspective view of the spiderlike element having radial arms adapted to mount the lower hooks of Figure 1,—this view also showing detached, the weight or sinker.

Figure 5 is a persepective view of the upper central elements of Figure 1, with links for retaining the bait holding device in position.

Figure 1:
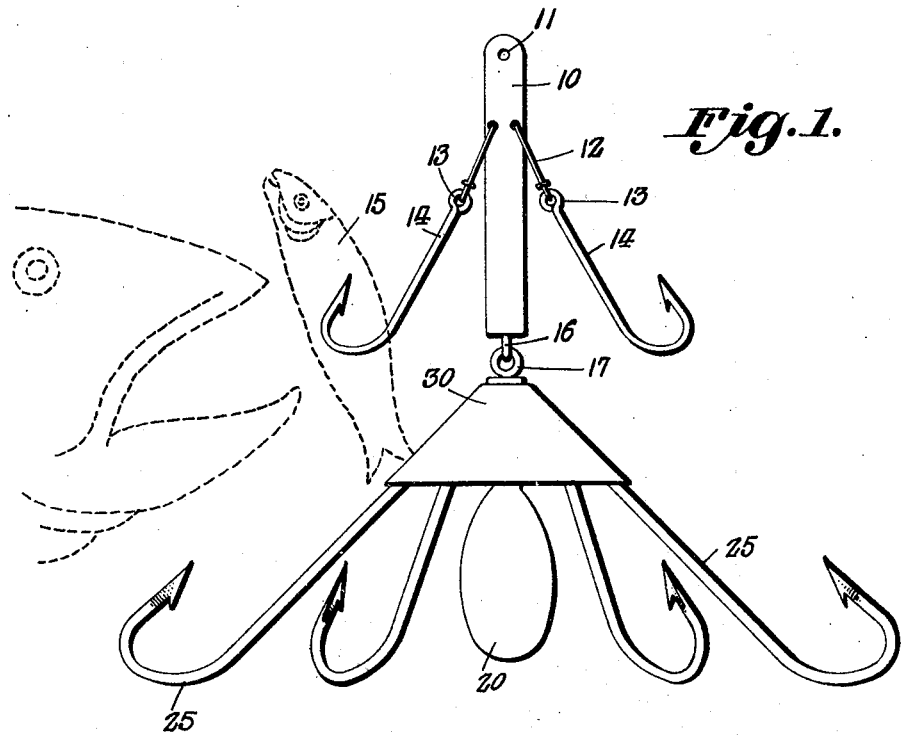
Figure 1 is a view of the device in elevation.

An upper central element, which may be of plate-like form, is designated 10, and is provided with an aperture 11 for connection with the line not shown. This element 10 is provided with additional apertures for the links 12 of Figures 1 and 5, these links being adapted for connection with the eye portions 13 of the bait holding devices, having in this instance the form of hooks 14 approximately of standard type. The bait is shown at 15, and it will be understood that any number of devices 14 may be provided, according to circumstances, and that any number of hooks may be employed in the lower part of the construction of Figure 1 and constituting the game securing devices per se.

The strip 10 carries on its lower end an eye member 16 adapted for connection with a similar element 17, the latter however being threaded as shown at 18 and adapted to engage a threaded bushing 19 mounted within the upper portion 19' of sinker 20. The sinker is not necessarily employed, as such, but is here shown, as the upper portion thereof 19' may conveniently serve the purpose here indicated.

Figure 2:
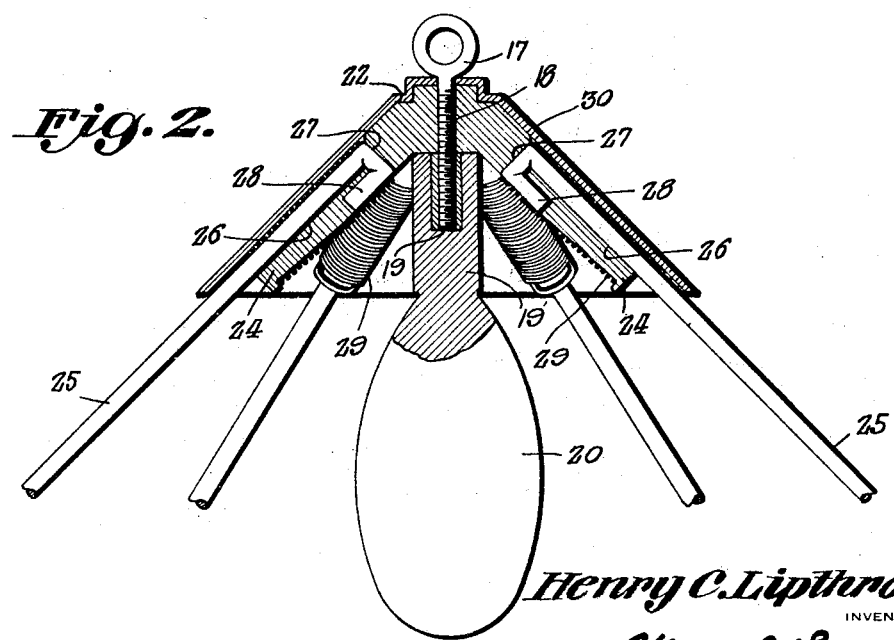
Figure 2 is a view in vertical section.

A spider has the general configuration illustrated in Figures 2 and 4, and includes the central portion 22 apertured at 23 for the threaded element 18. The spider further includes the radial and downwardly deflected arms 24 which serve to mount the shanks of the principal hooks designated 25.

The arms 24 are channeled longitudinally as shown at 26, and receive the shanks of the hooks last named, the extreme upper ends of the shanks passing thru apertures 27, and thence being turned over or clinched as shown at 28. This provides for effectually retaining the hooks and they may therefore be replaced individually. If desired a winding 29 of flexible or pliable material may be used in order to further secure the hooks 25.

A cover member 30 is preferably of cone shape and conforms to the configuration of the spider, the upper ends of the shanks of hooks 25 being adjacent to the inner wall of the cone. This device last named is apertured centrally for the shank of the member 17, and a flexible connection is provided between the lower portion of the structure and the upper element 10, in view of the connections shown in Figures 1 and 2. This permits of the various movements of the fish without unnecessary twisting of the line. The elements 10 and 30 may present any desired appearance in order to attract the fish independently of the bait employed.

What is claimed is:—

1. A device for mounting a plurality of fish hooks, comprising a central body and radially extending arms, diverging and extending downwardly, the arms being channeled longitudinally, and hooks having their shanks within the channels, with portions passing thru the arms, the ends of the shanks being turned to position approximately parallel with the main portions of said shanks.

2. In a device of the class described, bait holding means, means having connection with the holding means and comprising an element having channels extending radially and hooks having their shanks secured within the channels, and means carried on said channeled element and extending as a cover member over these portions of the shanks within the channels.

In testimony whereof I affix my signature

HENRY CLINTON LIPTHROTT.